Aug. 11, 1931.   P. S. MORGAN   1,818,421
CLUTCH MECHANISM
Filed July 26, 1927    2 Sheets-Sheet 1
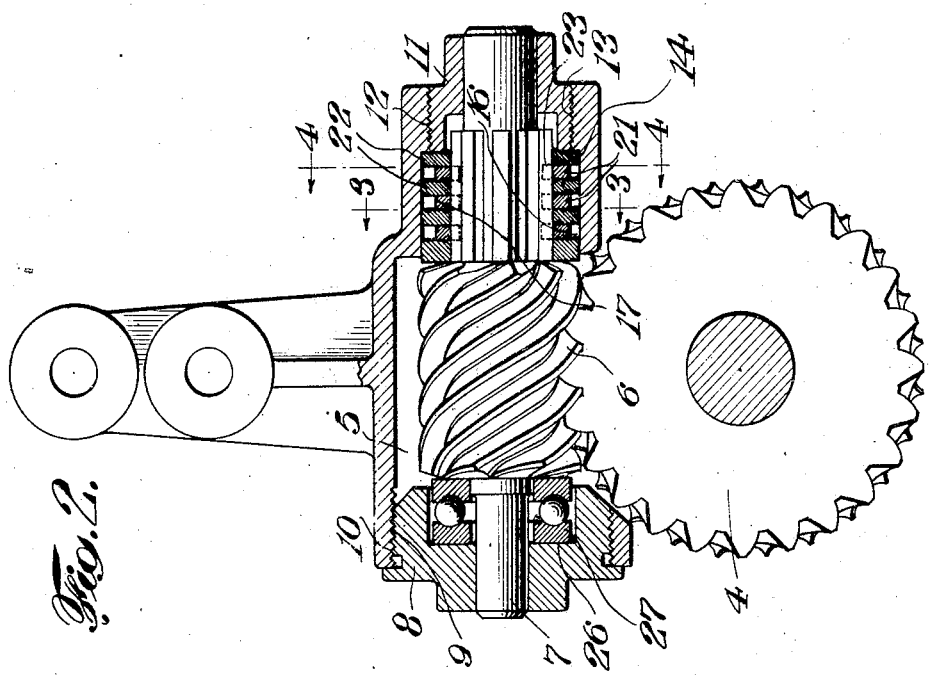
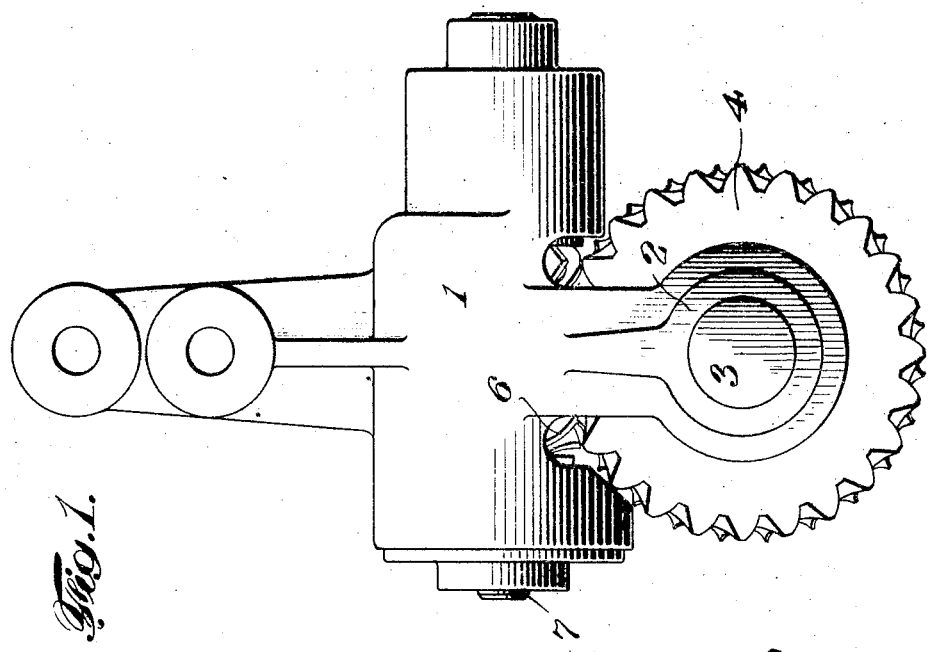
Inventor
Porter S. Morgan
By his Attorney

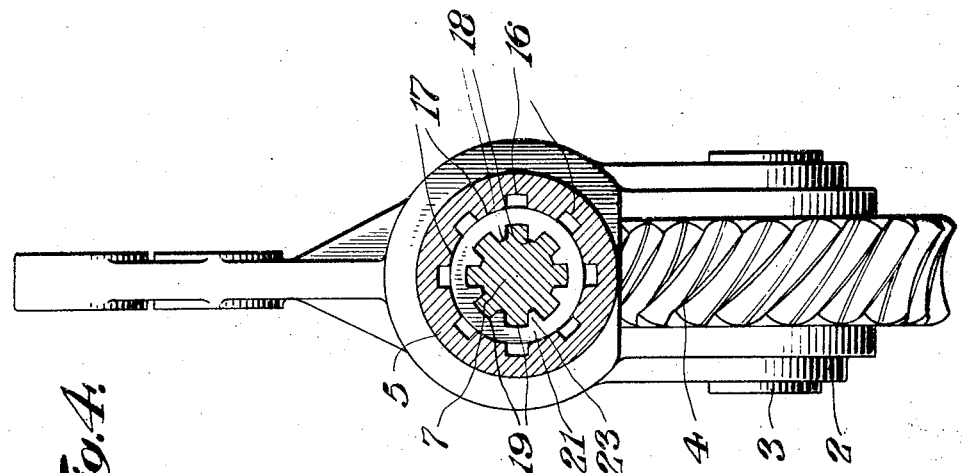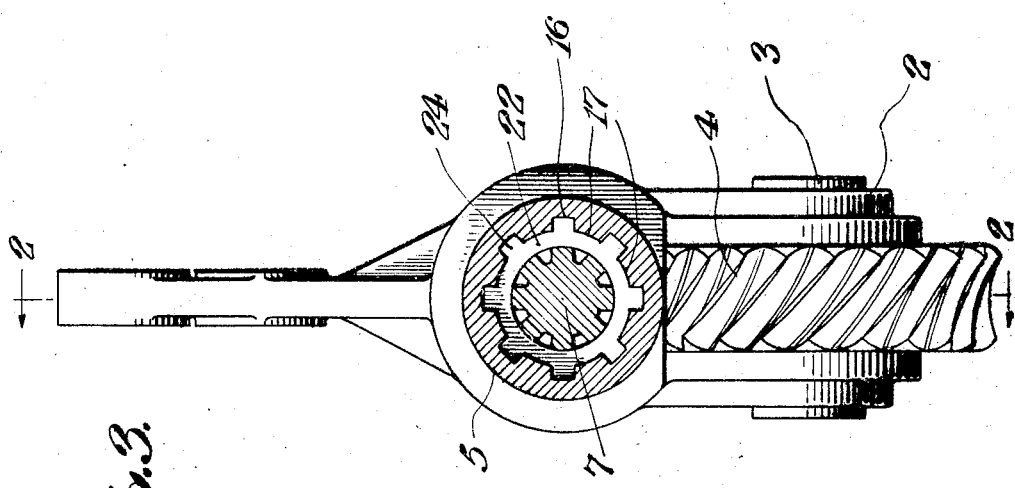

Patented Aug. 11, 1931

1,818,421

UNITED STATES PATENT OFFICE

PORTER S. MORGAN, OF DARIEN, CONNECTICUT

CLUTCH MECHANISM

Application filed July 26, 1927. Serial No. 208,459.

This invention relates to clutch mechanisms. It is an object of the invention to provide a mechanism which shall permit relative rotation of two parts in one direction, but which shall grip positively and surely in any position to prevent relative rotation between said parts in the opposite direction.

It is a further object of the invention to provide a mechanism of rugged and durable construction in which the stresses and strains are so distributed that the apparatus will withstand satisfactorily the application of heavy forces.

Other objects and advantages of the invention will appear hereinafter.

A preferred embodiment of the invention selected for purposes of illustration is shown in the accompanying drawings, in which, Figure 1 is a side elevation.

Figure 2 is a section on the line 2—2 of Figure 3.

Figures 3 and 4 are sections on the lines 3—3 and 4—4 of Figure 2.

Referring to the drawings, the apparatus comprises a casing 1 having bosses 2 adapted to support the transverse shaft 3 having secured thereto in any suitable manner a worm gear 4. The casing 1 is provided with a substantially cylindrical cavity 5 in which is mounted the worm 6 which is carried on the shaft 7 which extends longitudinally through the cavity 5 in position to mesh with worm gear 4. At one end the shaft 7 is supported in the cap 8 which is provided with external thread 9 to mesh with an internal thread 10 in the cylindrical cavity. The other end of the shaft 7 is supported by the cap 11 having an external thread 12 adapted to mesh with the internal thread 13 formed in the reduced end portion 14 of the cavity 5.

The interior surface of the reduced end portion 14 of the cavity 5 is splined to provide alternate longitudinally extending grooves and flanges 16 and 17 respectively, and the shaft 7 is likewise splined to provide the alternate longitudinally extending grooves and flanges 18 and 19 respectively. Arranged within the reduced end portion 14, and between the worm 6 and the cap 11 are a plurality of disks 21 and 22, surrounding the splined portion of the shaft 7 and arranged in parallel planes. The disks 21 are provided with internal teeth 23 which mesh with the grooves 18 of the splined portion of the shaft 7, but the outside diameter of the said disks is sufficiently small so that the disks fit within the inside surfaces of the flanges 17 of the internal spline of the cavity. The disks 22 are provided with external teeth 24 which mesh with grooves 16 of the splined portion of the cavity 5. The disks 22 are thereby permitted slight longitudinal movement with respect to the casing 1, within limits dependent upon the setting of the cap 11, but are prevented from rotation with respect thereto. The disks 21 are likewise permitted slight longitudinal movement but are caused to rotate with the shaft 7 at all times.

The cap 8 is provided with a recess 26 and mounted therein is a ball thrust bearing 27 surrounding the shaft 7 and adapted to take endwise thrust of the shaft 7 in one direction without substantial frictional resistance. As will be observed, however, endwise thrust of the shaft 7 in the other direction will pack the disks 21 and 22 against one another and provide frictional resistance to relative rotation therebetween.

It will now be observed that if the worm gear 4 is fixed, and if the casing 1 and its associated parts are moved with respect thereto in clockwise direction as shown in Figures 1 and 2, the worm 6 will be caused to rotate and the endwise thrust of the shaft 7 will be taken by the thrust bearing 27, the disks 21 and 22 being permitted to rotate relatively freely with respect to one another. If, however, it is attempted to move the casing 1 in the opposite or counter-clockwise direction, the endwise thrust of the shaft 7 packs the disks 21 and 22 one against another, the frictional resistance therebetween being sufficient to prevent rotation of the worm 6 and the shaft 7 and thus to prevent movement of the casing in counter-clockwise direction.

It will be apparent that the greater the force applied to rotate the casing in counter-clockwise direction, the greater the frictional resistance which is developed, the frictional resistance being sufficient in all cases within the limit of structural strength of the apparatus to prevent slippage. By adjusting the position of the cap 11, the back lash of the mechanism may be adjusted to any desired degree. By setting up on the cap 11 so that the disks 21 and 22 are in close relationship to one another, back lash may be reduced to an imperceptible degree. By loosening the cap 11 the back lash may be increased if desired.

If it is desired that the friction device or brake be released in order that the casing may be moved freely in counter-clockwise direction, the cap 11 may be backed off sufficiently to relieve the frictional resistance between the disks 21 and 22, whereupon the casing may be rotated freely in counter-clockwise direction.

It is to be understood that the invention may be variously modified and embodied within the scope of the subjoined claims.

I claim as my invention:

1. In a mechanism of the class described, a worm gear, a worm meshing therewith, a shaft carrying said worm, a bearing to take endwise thrust of said shaft in one direction without substantial frictional resistance, and means to resist relative rotation of said worm gear and worm when said shaft is thrust endwise in an opposite direction, said means comprising a plurality of axially slidable disks.

2. In a mechanism of the class described, a worm gear, a worm meshing therewith, a shaft carrying said worm, a bearing to take endwise thrust of said shaft in one direction without substantial frictional resistance, a multi-plate friction brake or retarding device to take endwise thrust of said shaft in the opposite direction, and means to release said brake.

3. In a clutch, a worm gear, a worm, a shaft carrying said worm, and means including a multi-plate friction brake or retarding device operated by endwise thrust of said shaft for resisting rotation of said worm in one direction but permitting rotation of said worm in an opposite direction.

4. In a clutch, a casing, a shaft carried therein, a worm gear on said shaft, a second shaft in said casing, a worm on said second shaft meshing with said worm gear, a bearing to take endwise thrust of said second shaft in one direction without substantial frictional resistance, a plurality of friction disks splined to said casing, a plurality of friction disks splined to said second shaft and arranged alternately with said first disks, said disks being free for relative rotation when said second shaft is thrust toward said thrust bearing, but being pressed one against another when said second shaft is thrust in the opposite direction.

5. In a clutch, a casing, a shaft carried therein, a worm gear on said shaft, a second shaft in said casing, a worm on said second shaft meshing with said worm gear, a bearing to take endwise thrust of said second shaft in one direction without substantial frictional resistance, a friction element splined to said casing, a friction element splined to said second shaft, said elements being free for relative rotation when said second shaft is thrust toward said thrust bearing, but being pressed one against another when said second shaft is thrust in the opposite direction.

6. In a clutch, a casing, a shaft carried therein, a worm gear on said shaft, a second shaft in said casing, a worm fixed on said second shaft and meshing with said worm gear, a roller bearing to take endwise thrust of said second shaft in one direction without substantial frictional resistance, a friction element secured against rotation in said casing but slidable longitudinally therein, a second friction element secured to rotate with said shaft and slidable longitudinally thereon, said elements being free for relative rotation when said second shaft is thrust toward said thrust bearing, but being pressed one against another when said second shaft is thrust in the opposite direction.

7. In a mechanism of the class described, a worm gear, a worm meshing therewith, a shaft carrying said worm, a bearing to take endwise thrust of said shaft in one direction without substantial frictional resistance, and a friction device to take endwise thrust of said shaft in the opposite direction, said device including a plurality of disks all slidable relative to said worm shaft.

8. In a ratchet, a worm gear, a worm, means including a shaft upon which said worm is mounted, a friction brake device for frictionally resisting rotation of said worm in one direction but permitting rotation of said worm in the opposite direction, and means for adjusting said device.

9. In a ratchet, a casing, a shaft carried therein, a worm gear on said shaft, a second shaft in said casing, a worm fixed on said second shaft and meshing with said worm gear, a roller bearing to take endwise thrust of said second shaft in one direction without substantial frictional resistance, a friction element secured against rotation in said casing but slidable longitudinally therein, a second friction element secured to rotate with said shaft and slidable longitudinally thereon, said elements being free for relative rotation when said second shaft is thrust toward said thrust bearing but being pressed one against another when said second shaft is thrust in the opposite direction, and an adjustable member acting to vary the amount of permissible sliding movement of said friction elements.

In testimony whereof, I have signed my name to this specification this 1st day of June, 1927.

PORTER S. MORGAN.